Aug. 6, 1957 R. E. SHRADER 2,801,840
DAMPING DEVICE FOR AN ANALYTICAL BALANCE
Filed Aug. 17, 1954 2 Sheets-Sheet 2
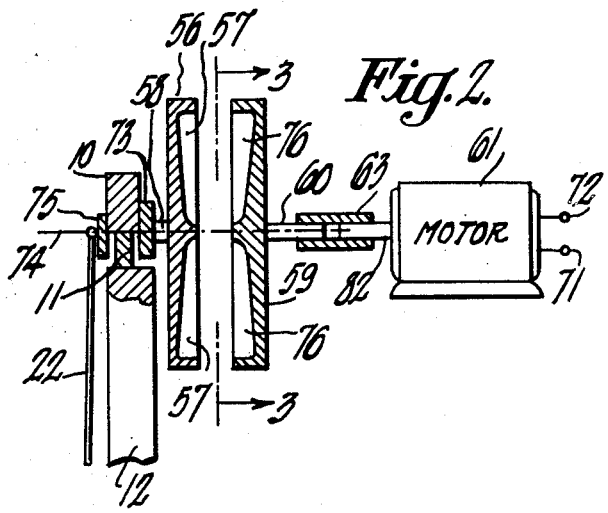
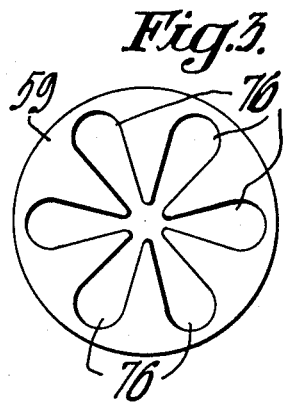
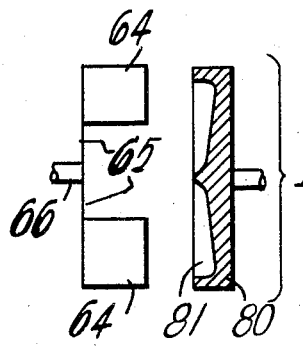
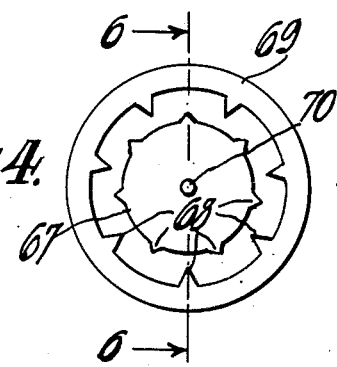
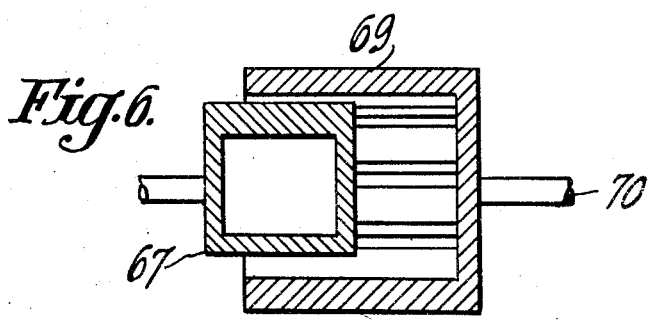
INVENTOR.
Ross E. Shrader
BY
ATTORNEY United States Patent Office 2,801,840
Patented Aug. 6, 1957

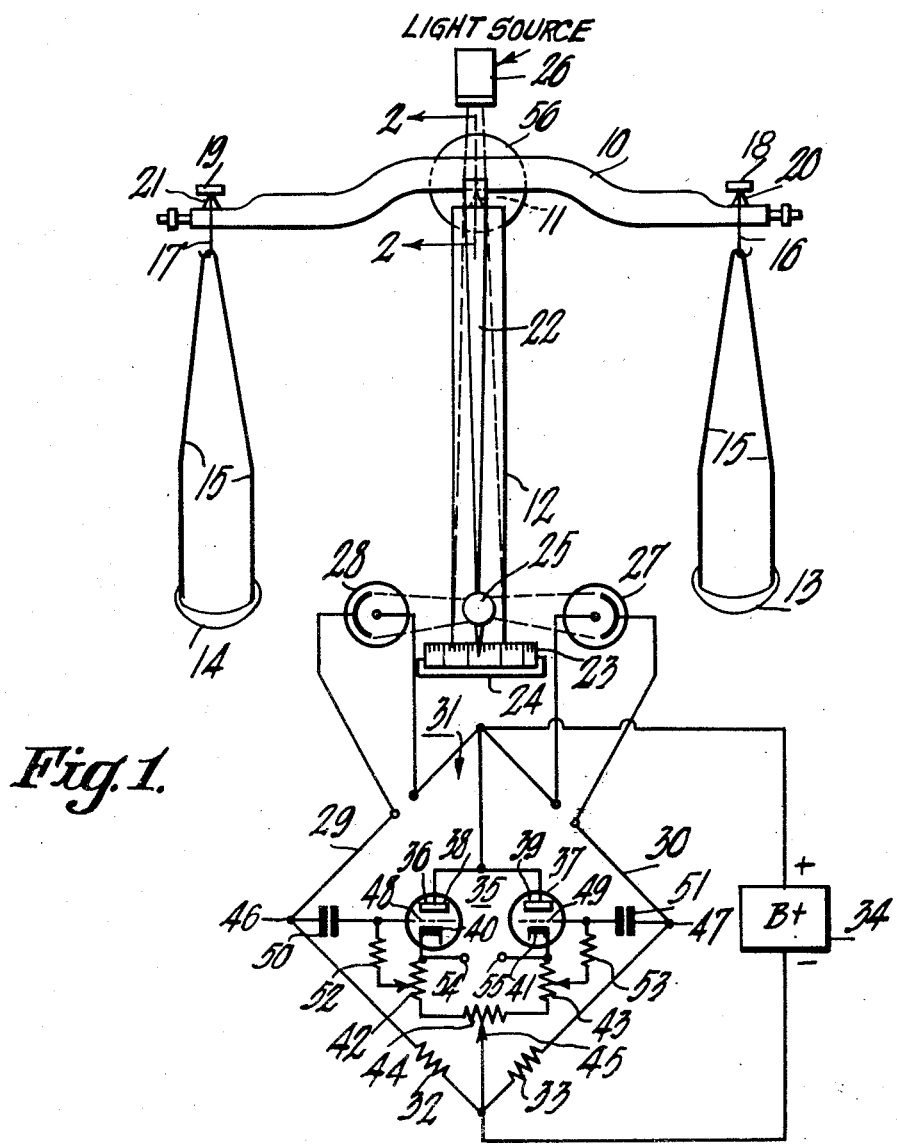

2,801,840

DAMPING DEVICE FOR AN ANALYTICAL BALANCE

Ross E. Shrader, Princeton, N. J., assignor to Radio Corporation of America, a corporation of Delaware Application August 17, 1954, Serial No. 450,490

7 Claims. (Cl. 265—54)

The present invention relates to weighing mechanisms and, more particularly, to a damping device for an analytical balance. A microbalance or other sensitive weighing mechanism may be improved by incorporating the damping device proposed by the present invention.

Analytical balances in general are prone to oscillate about their balance point when initially released. More pronounced oscillations are produced by very sensitive balances. In particular, microbalances may fail to reach their rest or balanced positions for considerable lengths of time. The presently available microbalances are built with a sensitivity of one part in ten million. This great sensitivity is necessary in order to determine minute weights. However, the slightest disturbance such as stray air currents causes the balance to swing wildly.

Magnetic damping devices may be adapted to damp the oscillations of analytical balances. A magnetic damping device for this purpose may consist of a powerful horse-shoe magnet located near the beam of the balance. An aluminum vane is mounted upon the beam and passes between the poles of the magnet. According to a well-known magnetic phenomenon the magnetic field opposes motion of the vane and thereby damps the oscillations of the balance. However, several factors militate against the use of magnetic damping for microbalances. Among these are the weight of the vane and stray magnetic fields produced by the magnet. Therefore, the present method of weighing with a microbalance requires skillful operations in obtaining the mean deflection of the pointer attached to the beam of the balance. It is usually necessary to note swing excursions of the pointer and calculate the mean deflection on paper. Since the pointer ordinarily over swings the scale, it is necessary to wait until the amount of swing gradually reduces so that the scale may be used.

According to the present invention, however, the time wasted in waiting for self-damping of the balance and the errors incurred in observation of the maximum deflection points to determine the mean deflection are alleviated. This invention proposes, in one embodiment thereof, a novel damping device in which a damping vane is attached to the beam of the balance. This vane is provided with the portions that intercept a surrounding medium such as the air. The damping vane is circular in shape and contains radial grooves which intercept the surrounding air. The vane is balanced about a central point in line with the knife edge supporting the beam. An impeller which may also be a disc-shaped member similar to the damping vane is located coaxially with the damping vane. The damping vane will oscillate with the beam. The impeller is rotated in a direction opposite the direction of oscillation of the damping vane. Consequently, the impeller sets up air currents that slow and damp the oscillation of the vane. The beam, therefore, quickly arrives at a rest position.

To control the movement of the impeller an electrical circuit is provided. This electrical circuit may be of the bridge type. Two photocells are located in adjacent arms of the bridge and are exposed to light reflected from a light reflecting substance which may be attached near the end of the pointer of the balance. Consequently, as the pointer oscillates, swinging back and forth, the photocells produce different amounts of current from the light reflected from the reflecting substance. The bridge circuit, therefore, is in and out of balance. Voltages are derived from opposite corners of the bridge circuit. The magnitudes and rate of change of these voltages are then utilized to control the movement of the impeller vane.

Although the damping system of the present invention is shown in use for damping oscillations of a chemical balance it will be understood that it may be employed for damping oscillating members, generally.

Consequently, the invention has for its major aim to provide a novel damping system for damping oscillations of an oscillating part or member and which possesses the advantages pointed out above.

It is another object of the present invention to provide a novel damping device for an analytical balance.

It is a further object of the present invention to provide a novel damping device which is especially useful in damping the oscillations of microbalances.

It is a still further object of the present invention to reduce over-swing in balances.

It is a still further object of the present invention to provide a damping device for balances which is sensitive to the swinging motion of the balance.

It is a still further object of the present invention to provide damping means for microbalances without the use of magnetic fields.

It is a still further object of the present invention to provide a damping device for analytical balances that adds a minimum of weight thereto.

Other objects and advantages of the present invention will, of course, become apparent and immediately suggest themselves to those skilled in the art to which the invention is directed from a reading of the following specification in connection with the accompanying drawings in which:

Figure 1 is a diagrammatic, vertical view of an analytical balance equipped with an illustrative embodiment of the present invention;

Figure 2 is a sectional view of the balance illustrated in Figure 1 taken along the section line 2—2 of Figure 1;

Figure 3 is a sectional view of Figure 2 taken along the line 3—3 of Figure 2;

Figure 4 is a sectional vertical, side view of another form of damping vane;

Figure 5 is a view in end elevation of still another form of a damping vane and an impeller; and Figure 6 is a sectional view of the arrangement of Figure 5 taken along the line 6—6 of Figure 5.

In Figure 1 an analytical balance is shown in simplified form as the setting for the present invention. The beam 10 of this balance is supported on a knife edge 11. A column 12 supports the base of the knife edge 11. The knife edge 11 is secured to the column 12 by any suitable means known in the art, as by welding, for example. Balance pans 13 and 14 are suspended on wires 15 which hang on hooks 16 and 17. The hooks 16 and 17 are attached to small blocks 18 and 19 respectively. These blocks rest and pivot upon knife edges 20 and 21 that are attached to the beam 10, by any suitable means. A pointer 22 is secured to the beam 10, by any suitable means, along a vertical line through the central knife edge 11. This pointer oscillates with the beam 10 and swings over a scale 23 located near the base 24 of the beam supporting column 12. This scale 23 is calibrated with graduations to enable observation of the excursions of the pointer 22. A reflecting substance, which may be a reflecting object such as a mirror or small white ball 25 is attached to the pointer 22 at a point near its end and swings with the pointer 22 as it oscillates. The ball 25 may be a pith ball coated with white diffusing paint. A light source 26, illustratively shown as being included in a square box above the beam 10, illuminates the small white ball 25.

Photoelectrical means such as the photocells 27 and 28 are located at equal distances from the central or locked position of the pointer 22. Light reflected from the reflecting object 25 is converted into electrical signals by the photocells 27 and 28. The photocells 27 and 28 form adjacent arms 29 and 30 of a bridge circuit 31. Two resistors 32 and 33 form the opposite adjacent arms of the bridge circuit. The bridge circuit 31 is supplied with operating potentials from a source 34, illustratively designated as B+.

A difference amplifier circuit 35 is connected across the bridge 31. This difference amplifier circuit contains two tubes 36 and 37. The anodes 38 and 39 of these tubes are connected together to the same corner of the bridge as is the positive terminal of the operating potential source B+. The cathodes 40 and 41 of these tubes are connected respectively to two resistors 42 and 43. The ends of these resistors 42 and 43 are connected across two opposite ends of a potentiometer 44. A movable arm 45 of the potentiometer 44 is connected to a corner of the bridge to which the negative terminal of the source of operating potential B+ is also connected. The remaining corners 46 and 47 of the bridge 31 are the output terminals of the photocell bridge circuit. They are coupled to the grids 48 and 49 of the tubes 36 and 37 respectively which form the input terminals of a difference amplifier circuit. Condensers 50 and 51 are the means whereby the grids 48 and 49 are connected to the output terminals 46 and 47 of the bridge 31. A resistor 52 is connected between the grid 48 and a tap on the cathode resistor 42 of the tube 36 of the difference amplifier circuit 35 and a similar resistor 53 is connected from the grid 49 to a tap on the cathode resistor 43 of the tube 37 in the difference amplifier circuit 35. The condenser 50 and the resistor 52 as well as the condenser 51 and the resistor 53 form differentiating circuits. The output signals from the bridge 31 which appear at the opposite corners 46 and 47, therefore, pass through these differentiating circuits before being applied to the input of the difference amplifier circuit 35. The output of the difference amplifier circuit 35 is available across the terminals 54 and 55 that are connected to the cathodes 40 and 41 of the tubes 36 and 37 respectively.

A damping vane 56 is shown attached to the far side of the beam 10. A useful form of this damping vane 56 and the impeller vane is shown in Figure 2. The damping vane 56 shown in Figure 2 is of the rotary type. It consists of a disc of a light metal such as magnesium, a plastic or the like having radial grooves 57. These grooves are substantially V-shaped and may extend to the periphery of the disc. The disc is attached to the beam 10 by means of a coupling 58. This coupling 58 is secured to a beam extension member 73 which may be part of the beam 10. The center of symmetry of the disc 56, therefore, preferably coincides with a line 74 extended along the knife edge 11 supporting the beam 10, as shown in Fig. 2. The term "center of symmetry" is used to indicate the axis of the cylindrical disc 56 about which the disc 56 is balanced. The pointer 22 is also preferably, but not necessarily, on the same line 74 extended along the knife edge 11, and may be attached, by any suitable means, to the beam 10 by another extension member 75. The extension members 73 and 75 may be part of the beam 10, or they may be attached thereto by any suitable means, as by welding, for example. It may be observed, that the damping vane 56 is balanced about the center of the beam 10, and, therefore, additional weights are not required to balance on the beam. The damping vane, consequently, places a minimum additional weight upon beam 10. Assuming that the medium through which the damping vane moves is the surrounding air, a viscous drag is incurred which aids in damping the oscillations of the beam. However, merely placing a damping vane on the beam is not ordinarily sufficient. Since the damping is a function of the drag in the air, the velocity of oscillation of the vane determines its damping action. At slow oscillations, therefore, the vane is of little assistance in damping.

According to the present invention, an impeller vane 59 is positioned near the damping vane 56 and is moved in a direction to force air currents onto the damping vane 56 in proper direction to damp the oscillations thereof. In the embodiment illustrated in Figure 2 and also shown in Figure 3, a similar disc 59 which also contains V-shaped radial grooves 76 is used as the impeller vane. The impeller vane is adjacent to and coaxial with the damping vane 56. A rod 60 is attached to the center of the impeller 59. A motor 61 having a shaft 62 is coupled to the rod 60 that is attached to the impeller 59. A coupling sleeve 63 connects the shaft 62 to the rod 60. Therefore, the motor 61 is adapted to rotate the impeller 59. The distance between the impeller 59 and the damping vane 56 may be adjusted by lengthening or shortening the distance between the rod 60 and the shaft 62. It will be apparent, however, that any suitable means for adjusting the distance between the impeller 59 and the damping vane 56 may be used. The force transferred by the air from the impeller 59 to the vane 56 will be determined partially by the distance therebetween. Therefore, the proper torque in the range of microgram-centimeters of torque may be transferred in order to damp the oscillation of the beam 10.

Another illustrative type of vane is shown in Figure 4. In order to construct a damping vane that is lighter in weight, a group of thin sheets of metal 64 are attached to rigid wires 65. These wires are then arranged "windmill fashion" in a radial array and attached at a central rod 66. This rod may then be attached to the beam 10, by any suitable means, along the line 74 extending from the knife edge 11. The radial area is symmetrical and, therefore, is balanced about the knife edge 11. An impeller 80 having radial grooves 81 similar to the one described in connection with Figure 2 and Figure 3 may be used to drive the vanes 64.

In Figures 5 and 6 still another impeller and vane assembly is shown. In this arrangement, the coupling between the impeller and the damping vane may be accurately adjusted. In Figure 5 a cylinder 67 which is fluted around its outside surface may be used as the damping vane. The fluting causes a series of protuberances 68 to catch the air or other medium, and thereby place a drag upon the beam of the balance. As shown in Figure 6, this cylinder 67 may be hollow to conserve weight. A hollow cylinder 69 which is internally fluted surrounds the cylinder 67. The internal portion of this cylinder 69 has rises which catch the air and thus set up rotating air current which cause motion of the internal cylinder 67. The extended cylinder 69 is provided with a closed end portion 70. Therefore, the damping vane is shielded from external air currents so that it may be completely controlled by the rotation of the outer cylinder 69. This outer cylinder 69 may be withdrawn to any extent. In this manner the coupling and, therefore, the force transferred between the impeller extended cylinder 69 and the internal damping vane cylinder 67 may be adjusted.

In the operation of the damping device, it is assumed that some object to be weighed has been placed on one of the balance pans 13 or 14. Therefore, the pointer 22 is deflected and begins to swing and oscillate over the scale 23. Consequently, the illumination by light reflected from the small white ball 25 of the photocells 27 and 28 changes. For example, when the pointer swings to the right, the light to the phototube 27 increases and the light to the phototube 28 decreases. This causes an unbalance in the bridge circuit 31. Output signals appear across the corners 46 and 47 of the bridge circuit 31. The signal at the corner 47 of the bridge circuit is applied to the grid 49 of the tube 37 on the right side of the difference amplifier circuit 35. The signal in the other corner 46 of the bridge circuit 31 is applied to the grid 48 of the other tube 36 on the left side of the difference amplifier circuit 35. However, these signals pass through the condensers 51 and 50 respectively. These condensers together with the respective grid resistors 53 and 52 form differentiating circuits. Therefore, the electrical signals produced by the phototubes 27 and 28 must be varying in order to be applied to the input of the difference amplifier circuit 35. Consequently the balance does not necessarily arrive at its center rest position in order to stop the action of the difference amplifier circuit 35.

Assuming for the present, however, that the pointer 22 is swinging, the difference amplifier 35 will produce an output signal across the terminals 54 and 55. The direction of this output signal depends upon the rate of changes of the intensity of the light that reaches the photocells 27 and 28. In the example mentioned above, the light to the photocell 27 is increasing, therefore, current will flow between the terminal 55 and the terminal 54. The terminals 71 and 72 of the motor 61 are connected to the output terminals 54 and 55 of the difference amplifier circuit 35. The direction of current through the motor 61 determinates its direction of rotation. It will be apparent that by proper connection of the motor terminals 71 and 72 to the output terminals 54 and 55 of the difference amplifier circuit 35, the impeller vane 59 may be made to rotate in a direction opposite to the rotation of the damping vane 56. Therefore, air currents will be applied to the damping vane in a direction to damp the oscillations of the beam.

The present invention has been described in connection with a damping device for an analytical balance. It will be appreciated that an analytical balance equipped with the damping device may be used as a self-balancing and recording balance. The capacitors 50 and 51 are shorted so that the grids 48 and 49 are directly connected to the corners 46 and 47 of the bridge 31 respectively. The impeller, therefore, will drive the beam to an equilibrium or rest position. This equilibrium is selected to coincide with the central rest position with the beam. Therefore, the degree of unbalance is measurable by the magnitude and the direction of the output current from the difference amplifier. This output current is consequently a measure of the difference-weight of the objects in the balance pans.

What is claimed is:

1. A damping device for an analytical balance having a beam comprising a damping vane attached to said bam and balanced about a central axis thereof, an impeller of the rotary type located adjacent to said vane, a fluid medium located in the space about said vane and said impeller, and means for rotating said impeller in a clockwise and a counterclockwise direction to propel said medium and to thereby oppose and damp the oscillations of said beam.

2. A damping device for an analytical balance having a beam supported on a knife edge and a pointer attached to said beam and oscillating with said beam comprising a circular air vane secured to said beam, the center of symmetry of said vane coinciding with the center line of said knife edge, a rotatable air impeller located adjacent to said vane, means for rotating said impeller, and means responsive to oscillations of said pointer for deriving electrical signals for controlling said impeller rotating means whereby to damp said beam oscillation.

3. A damping device for an analytical balance having a beam supported on a knife edge, weighing pans on the opposite ends of said beam and a pointer attached at the center of said beam, said device comprising a disc having radial grooves therein attached to said beam, said disc having its center of symmetry coinciding with a line through said knife edge, a second similar disc displaced from and coaxial with said first-named disc, means for rotating said second disc, an air-like medium provided between said grooved discs and being propelled on rotation of one of said discs, a light reflecting substance located near the end of said pointer, means for illuminating said substance, a pair of photoelectric pick-up means on opposite sides of said pointer, said photoelectric means being responsive to light reflected from said substance, and electrical circuit means connected between said photoelectric means and said second disc rotating means for providing electrical signals for controlling the speed and direction of rotation of said second disc.

4. A damping device for an analytical balance having a beam supported on a knife edge, a pointer attached at the center of said beam and weighing pans suspended at the opposite ends thereof said device comprising a plurality of thin air vanes supported on rigid wires, said vanes being fixed on said beam in a radial array, the center of symmetry of said array coinciding with a line through said knife edge, a rotary air impeller located adjacent to and coaxial with said radial array, means for adjusting the distance between said impeller and said vanes, a light reflecting object located to oscillate with said beam, means for illuminating said object, photoelectric pick-up means, said photoelectric means transducing the light reflected from said light reflecting object into electrical signals, electrical circuit means responsive to changing intensities of said electrical signals, and electromotive means connected to said circuit means for rotating said impeller.

5. A damping device for an analytical balance having a beam supported on a knife edge, a pointer attached at the center of said beam and weighing pans suspended at the opposite ends thereof said device comprising a cylinder supported on said beam, said cylinder having flutes thereon, the center of symmetry of said cylinder coinciding with a line through said knife edge, a hollow cylinder coextensive with and spaced from said first-named cylinder, said hollow cylinder having internal flutes whereby rotary motion of said hollow cylinder will be transmitted to said first-named cylinder through an air-like medium in the space between said cylinders, means for adjusting the coupling between said cylinders, a light reflecting object located near the end of said pointer, means for illuminating said object, photoelectric pick-up means being located on opposite sides of said pointer, said photoelectric means transducing light reflected from said light reflecting object into electrical signals, electrical circuit means responsive to changing intensities of said electrical signals, and means connected to said circuit means for rotating said hollow cylinder.

6. A damping device for an analytical balance having a beam and a pointer attached to oscillate with said beam comprising a damping vane attached to said beam, an impeller vane located adjacent to said damping vane to apply a driving force thereto when rotated, said impeller and said vane being located in a fluid medium which is set in motion upon rotation of said impeller to apply said driving force, a reflecting substance positioned on said pointer near the point of maximum amplitude of oscillation thereof, means for shining light on said substance whereby said light is reflected therefrom, photoelectric transducers located on opposite sides of said pointer near said substance whereby a greater amount of light is reflected into one of said transducers than into the other on oscillation of said pointer, a bridge circuit, said photoelectric transducers forming adjacent arms of said bridge circuit, output signals being derived from opposite corners of said bridge circuit, a difference amplifier having two input terminals and two output terminals, connection means for applying said output signals separately to each of said input terminals, a motor for rotating said impeller, and means connecting said motor across said difference amplifier output circuit whereby said impeller will be driven to damp said beam oscillations.

7. The damping device according to claim 6 in which said means for connecting said output signals separately to each of said input terminals includes differentiating circuits connected to each of said input terminals.

References Cited in the file of this patent

UNITED STATES PATENTS

| | | |
|---|---|---|
| 1,743,163 | Schaper | Jan. 14, 1930 |
| 1,802,150 | Johnson | Apr. 21, 1931 |
| 1,956,188 | Black | Apr. 24, 1934 |
| 2,280,897 | Denman | Apr. 28, 1942 |
| 2,419,372 | Schneider | Apr. 22, 1947 |